(12) United States Patent
Strand et al.

(10) Patent No.: US 7,964,079 B2
(45) Date of Patent: Jun. 21, 2011

(54) ELECTROSTATIC COALESCING DEVICE

(75) Inventors: Rune Strand, Spikkestad (NO); Svein Tryti, Bødalen (NO); Svein Jørgensen, Hønefoss (NO)

(73) Assignee: Hamworthy plc, Poole (GB)

( * ) Notice: Subject to any disclaimer, the term of this patent is extended or adjusted under 35 U.S.C. 154(b) by 388 days.

(21) Appl. No.: 12/301,737

(22) PCT Filed: May 25, 2007

(86) PCT No.: PCT/IB2007/001373
§ 371 (c)(1),
(2), (4) Date: Nov. 20, 2008

(87) PCT Pub. No.: WO2007/138434
PCT Pub. Date: Dec. 6, 2007

(65) Prior Publication Data
US 2009/0269256 A1    Oct. 29, 2009

(30) Foreign Application Priority Data
May 26, 2006    (NO) .................................... 20062419

(51) Int. Cl.
*B01D 17/06* (2006.01)
(52) U.S. Cl. .................. 204/672; 204/660; 204/666
(58) Field of Classification Search .................. 204/672
See application file for complete search history.

(56) References Cited

U.S. PATENT DOCUMENTS

| 4,240,908 | A | | 12/1980 | Swain et al. |
| 4,255,615 | A | | 3/1981 | Huang et al. |
| 4,332,167 | A | | 6/1982 | Sun et al. |
| 4,702,815 | A | | 10/1987 | Prestridge et al. |
| 4,804,453 | A | * | 2/1989 | Sublette et al. ............... 204/673 |
| 5,137,552 | A | * | 8/1992 | Sasaki ................................. 96/80 |
| 6,110,321 | A | | 8/2000 | Day et al. |
| 6,129,829 | A | * | 10/2000 | Thompson ..................... 204/665 |
| 2004/0022294 | A1 | | 2/2004 | Yamamori et al. |

(Continued)

FOREIGN PATENT DOCUMENTS

DE    4026802 A1    2/1992

(Continued)

OTHER PUBLICATIONS

PCT/ISA/210—International Search Report—Oct. 19, 2007.

(Continued)

*Primary Examiner* — Harry D Wilkins, III
*Assistant Examiner* — Bryan D. Ripa
(74) *Attorney, Agent, or Firm* — Venable LLP; Eric J. Franklin

(57) ABSTRACT

An electrical appliance including at least one sheet-shaped electrode and a connecting device for electrically connecting the at least one electrode to a voltage source. The connecting device includes a casing having two or more tubular casing parts. Each casing part enclosing a channel filled with a dielectric medium, and an elongated conductor for feeding electric power from the voltage source to the at least one electrode. The conductor extends through the channels of the casing parts and is surrounded by the dielectric medium therein. The conductor extends through a hole in an electrically conductive member of each individual electrode. The conductor is electrically connected to the conductive members of the electrodes and each individual electrode has a part arranged between two of the casing parts with the two casing parts clamped against opposite sides of the intermediate electrode part.

15 Claims, 5 Drawing Sheets

U.S. PATENT DOCUMENTS

2005/0036924 A1 *  2/2005  Nilsen et al. ............. 422/186.04

FOREIGN PATENT DOCUMENTS

| EP | 1085632 | 3/2001 |
|---|---|---|
| GB | 1046317 | 10/1966 |
| GB | 2385009 A | 8/2003 |
| WO | WO-03049834 A1 | 6/2003 |
| WO | WO-2004/044367 A2 | 5/2004 |

OTHER PUBLICATIONS

PCT/ISA/237—Written Opinion of the International Searching Authority—Oct. 19, 2007.

PCT/IPEA/409—International Preliminary Report on Patentability—Aug. 25, 2008.

PCT/IPEA/408—Written Opinion of the International Preliminary Examining Authority, Apr. 7, 2008.

* cited by examiner

US 7,964,079 B2

ELECTROSTATIC COALESCING DEVICE

CROSS-REFERENCE TO RELATED APPLICATIONS

This application claims priority to Norwegian patent application 20062419 filed 26 May 2006 and is the national phase under 35 U.S.C. §371 of PCT/IB2007/001373 filed 25 May 2007.

FIELD OF THE INVENTION AND PRIOR ART

The present invention relates to an electrical appliance comprising one or several sheet-shaped electrodes and a connecting device for electrically connecting said one or several electrodes to a voltage source.

The invention is particularly applicable to electrical appliances in the form of electrostatic coalescing devices for promoting the coalescence of an emulsion component in an emulsion comprising a mixture of at least two different fluid components by means of an electric field applied to the emulsion, e.g. for promoting the coalescence of water in an emulsion comprising oil and water.

In the oil and gas industry where oil is extracted from one or more wells in an oil field, oil will be extracted together with water. The water has to be removed from the oil and this is mainly done by means of settling tanks in which the oil is permitted to settle under the action of gravity. However, stable oil-water emulsions may develop during the production of the oil. For example, the use of gas-liquid cyclones might contribute to a stable emulsion that will be difficult to separate only by means of settling. After having passed through, for example, a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different permittivity.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity than said continuous phase. The dispersed phase may for instance be an electrical conductor, such as water. In an electrostatic coalescing device, an emulsion is subjected to an alternating current field or to a continuous or pulsed direct current field.

WO 03/049834 A1 discloses an electrostatic coalescing device comprising several planar sheet-shaped electrodes extending in parallel with each other so as to form flow passages for an emulsion between each pair of adjacent electrodes. Different electric potentials are applied to the electrodes so as to form an electric field between each pair of adjacent electrodes, which e.g. will promote the coalescence of water contained in a water-in-oil emulsion flowing through the flow passages between the electrodes.

GB 2 385 009 A discloses an electrostatic coalescing device in the form of a so-called dielectrophoresis unit, which comprises several pairs of undulated sheet-shaped electrodes with the undulated electrodes of each pair arranged in such a manner in relation to each other that the mutual distance between the electrodes in each pair varies along the electrodes as seen in a direction perpendicular to the intended flow direction of fluid passing between the electrodes. The undulated electrodes in each pair are arranged side-by-side to define constrictive flow passage portion's and widened flow passage portions. Thus, the electric field between the electrodes of each pair is inhomogeneous as seen in a cross section perpendicular to said flow direction, i.e. the field strength is different in different parts of the flow passage between the electrodes of each pair as seen in such a cross section. In an inhomogeneous electric field acting on an emulsion containing emulsion components of different permittivity, dielectrophoretic forces acting on the emulsion components will be generated. In an emulsion comprising water droplets in oil, the dielectrophoretic forces will contribute to moving individual water droplets to regions having a stronger electric field than neighboring regions so as to thereby form an enhanced concentration of water droplets in these regions, which will promote the coalescence of water droplets in these regions. The water droplets have a higher permittivity than the surrounding oil and will be affected by the dielectrophoretic forces acting in the direction of the field gradient of the inhomogeneous electric field between the electrodes.

SUMMARY OF THE INVENTION

The object of the present invention is to propose an efficient and secure manner of electrically connecting one or several sheet-shaped electrodes of an electrical appliance, such as an electrostatic coalescing device, to a conductor that is electrically connected to a voltage source.

According to the invention, this object is achieved by an electrical appliance.

The inventive electrical appliance, which comprises one or several sheet-shaped electrodes and a connecting device for electrically connecting said one or several electrodes to a voltage source, is characterized in:

that the connecting device comprises a casing having two or more tubular casing parts, each of which enclosing a channel filled with a dielectric medium;

that the connecting device comprises an elongated conductor for feeding electric power from the voltage source to said one or several electrodes, said conductor extending through the channels of said casing parts and being surrounded by the dielectric medium therein; and that the casing is secured to said one or several electrodes with the conductor extending through a hole in an electrically conductive member of each individual electrode, the conductor being electrically connected to the conductive members of the electrodes and each individual electrode having a part arranged between two of said casing parts with the two casing parts clamped against opposite sides of the intermediate electrode part.

With the inventive solution, the electrical connection point between the conductor of the connecting device and an individual electrode is located inside the channels of the two casing parts arranged on opposite sides of the electrode and is surrounded by the dielectric medium contained in said channels. Thus, said connection point is protected by the dielectric medium contained in said channels and may be fully electrically insulated from the surroundings by this dielectric medium. Furthermore, the conductor of the connecting device may be connected to the electrode at a relatively small area of the electrode located anywhere on a preferably locally planar surface of the electrode, which gives high flexibility in the mechanical design of the electrical appliance and makes it possible to use conventional and proven liquid and gas proofing solutions in order to seal the contact areas between the casing parts and the electrodes. The inventive solution also makes it possible to connect several sheet-shaped electrodes to one and the same conductor rather easily.

According to a preferred embodiment of the invention, the casing parts are sealingly clamped against the intermediate electrode parts so as to thereby seal the channels of the casing parts from the surroundings. Hereby, liquid and gas will be prevented from migrating into the connecting device via the contact areas between the casing parts and the electrodes and the connection point between the conductor of the connecting device and an individual electrode will thereby be protected from hostile environment.

According to another embodiment of the invention, the casing parts are clamped to the intermediate electrode parts by means of a traction force exerted via the conductor. Thus, the conductor will, besides functioning as a conventional electrical conductor, also function as a traction member for keeping the casing parts clamped to the electrodes and thereby hold the connecting device together when assembled. This makes it possible to reduce the number of components of the connecting device and the connecting device can thereby be given a rather simple construction. The inventive electrical appliance preferably constitutes an electrostatic coalescing device.

Further advantages as well as advantageous features of the inventive electrical appliance will appear from the following description.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

The present invention relates to an electrical appliance comprising one or several sheet-shaped electrodes 1 and a connecting device 30 for electrically connecting said one or several electrodes 1 to a voltage source, preferably a high-voltage source.

High voltage is here to be understood as typically above 1 kV. A connecting device 30 of the type here described may be dimensioned to handle voltages up to and exceeding 100 kV.

Figure 1A:
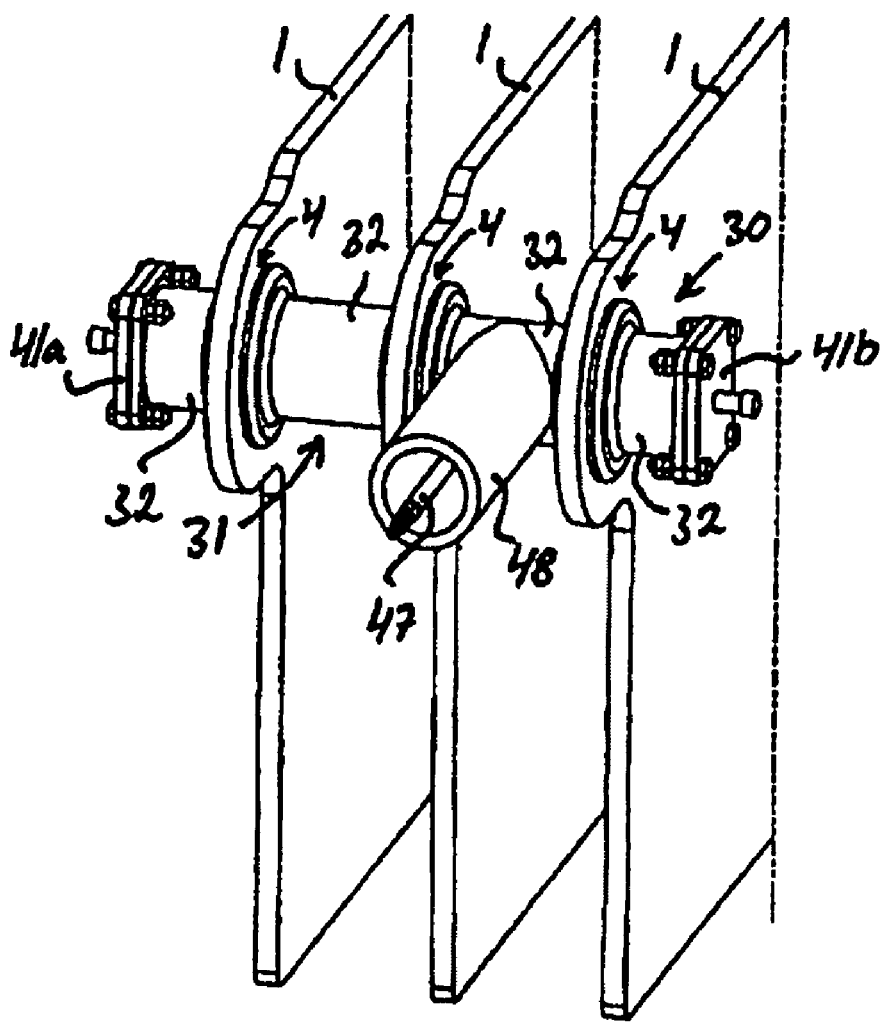
FIG. 1a is a schematic perspective view of a connecting device and sheet-shaped electrodes included in an electrical appliance according to the present invention.
Figure 1B:
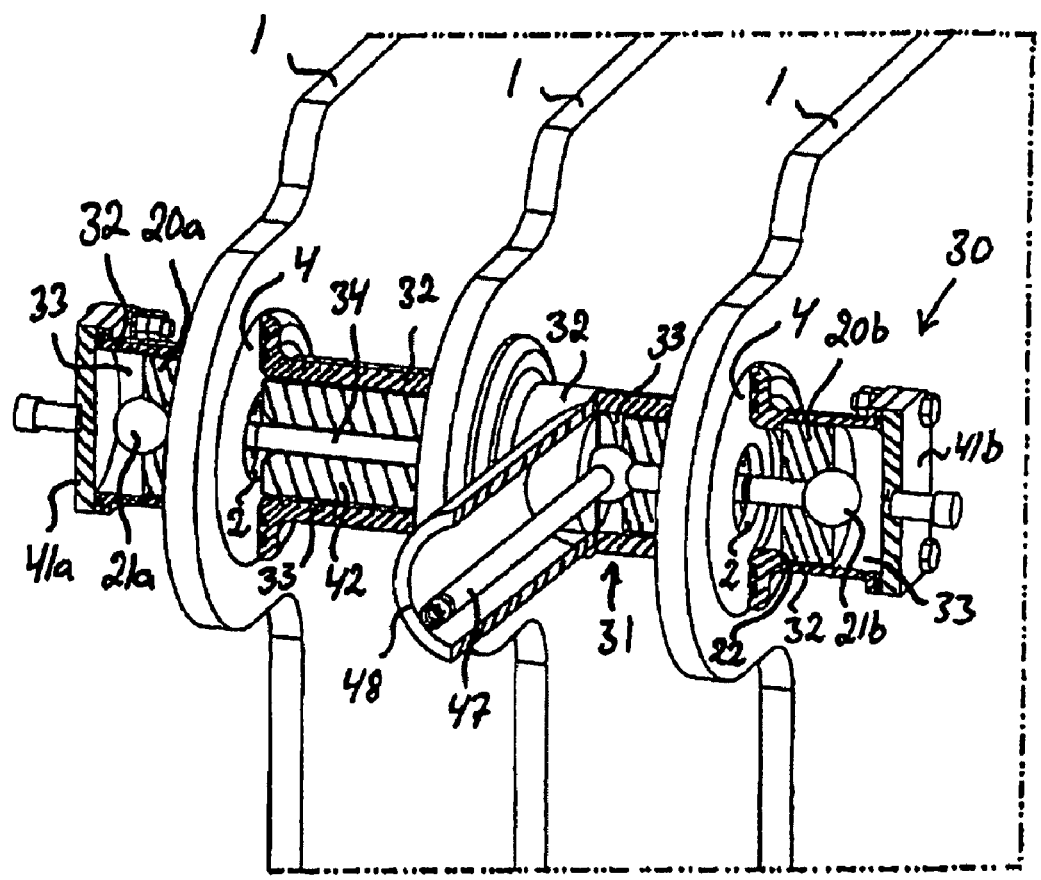
FIG. 1b is a schematic, partially cut perspective view of the connecting device and the sheet-shaped electrodes of FIG. 1a, FIG. 2 is a schematic longitudinal sectional view of a part of the connecting device of FIGS. 1a and 1b.

A unit consisting of three plate-shaped electrodes 1 and an associated connecting device 30 is illustrated in FIGS. 1a and 1b. The connecting device 30 comprises a casing 31 having several tubular casing parts 32. Three such casing parts 32 are illustrated in a longitudinal section in FIG. 2. Each casing part 32 encloses a channel 33 filled with a dielectric medium. The dielectric medium may for instance be a dielectric fluid, such as oil, gas or solid dielectric material. The connecting device further comprises an elongated conductor 34 for feeding electric power from a voltage source to the electrodes 1. The conductor 34 extends through the channels 33 of the casing parts 32 and is surrounded by the dielectric medium therein. Thus, the conductor 34 is electrically insulated from the walls of the casing parts 32 by means of the dielectric medium contained in the channels 33 of the casing parts. The casing 31 is secured to the electrodes 1 with the conductor 34 extending through a hole 2 in an electrically conductive member 3 of each individual electrode 1 (see FIGS. 1b and 3). The conductor 34 is electrically connected to the conductive members 3 of the electrodes and each individual electrode 1 has an electrode part 4 arranged between two of said casing parts 32 with the two casing parts 32 clamped against opposite sides of the intermediate electrode part 4. Each pair of two adjacent casing parts 32 is sealingly clamped against the associated electrode part 4 so as to thereby seal the channels 33 of the casing parts from the surroundings. In the example illustrated in FIGS. 1a and 1b, end plates 41a, 41b are mounted at each end of the casing 31 in order to close the channels 33 of the casing parts 32 so as to thereby form a closed space around the conductor 34. The conductor 34 and the connection points between the conductor and the respective electrode 1 will consequently be electrically insulated and physically protected from the surroundings by the casing 31 and the dielectric medium contained therein. Thus, the connecting device 30 is well suited for use in aggressive environments.

The conductor 34 is electrically connected to the respective electrode 1 via an electric connection member 35 arranged inside the casing 31 in electrical contact with the conductor 34 and the conductive member 3 of the electrode. In the example illustrated in FIGS. 2 and 3, the respective connection member 35 comprises a sleeve 36 of electrically conductive material attached around the conductor 34 in electrical contact therewith. The conductor 34 extends through a through hole 37 in the sleeve 36 and is in electrical contact with the sleeve via contact elements 38 protruding on the inner surface of the sleeve 36, i.e. on the inner wall of the through hole 37 that extends through the sleeve. The contact elements 38 are preferably flexible so as to allow the contact elements 38 to flex and exert a resilient clamping force against the surface of the conductor 34 when the conductor is forced through the through hole 37 of the sleeve. The sleeve 36 is thereby clamped to the conductor 34 in such a manner that the conductor 34 is slidable relative to the sleeve 36 in the longitudinal direction of the conductor. The conductive member 3 of the associated electrode 1 is electrically connected to the sleeve 36, for instance by being in contact with the outer surface of the sleeve 36 either directly or via one or several intermediate contact members. In the illustrated example, the conductive member 3 of the electrode 1 is secured to the sleeve 36 by means of two interacting nuts 39a, 39b which are screwed onto an external thread 40 of the sleeve. The conductive member 3 is clamped between these nuts 39a, 39b at the part of the conductive member surrounding the hole 2 in the conductive member. The nuts 39a, 39b are suitably of electrically conductive material so as to allow the conductive member 3 of the electrode 1 to be electrically connected to the sleeve via these nuts. One of the nuts could be replaced by a fixed shoulder arranged on the outer surface of the sleeve 36. The electric connection member for electrically connecting the conductor 34 to the conductive member 3 of the electrode 1 may also have other designs than here shown.

The conductor 34 preferably has the form of a rod of electrically conductive material, but it may alternatively have the form of a cable or a wire or the similar. The casing parts 32 are suitably clamped to the intermediate electrode parts 4 by means of a traction force exerted via the conductor 34. The traction force may for instance be accomplished by means of one or more tightening members, such as nuts, attached at one end or both ends of the conductor 34. In the example illustrated in FIG. 1b, the conductor 34 is at its opposite ends clamped to spacers 20a, 20b by means of spherical tightening members 21a, 21b secured to the respective end of the conductor 34. In this case, the respective end of the conductor 34 is provided with an external thread and the associated tightening member 21a, 21b is provided with a corresponding internal thread. By tightening the tightening members 21a, 21b, the tightening members will press the respective spacer 20a, 20b against a shoulder 22 provided inside the associated casing part 32 and a traction force will thereby be exerted via the conductor 34. The respective spacer 20a, 20b is of non-conductive material. In the illustrated example, the respective tightening member 21a, 21b is partly received in a recess in the associated spacer 20a, 20b. The respective tightening member 21a, 21b is arranged at a distance from the adjacent end plate 41a, 41b and from the wall of the surrounding casing part 32 so as to prevent contact between tightening member and end plate and between tightening member and casing.

Figure 2:
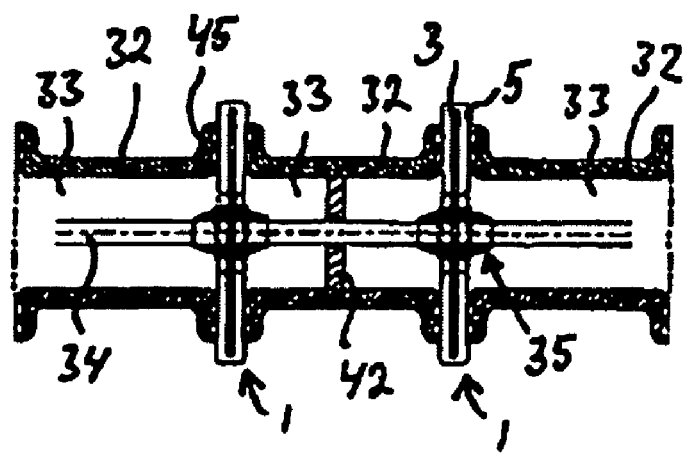

At least one of the casing parts 32, preferably each one of them, is suitably provided with at least one spacer 20a, 20b, 42 of electrically non-conductive material, such as plastic or ceramic material, which is arranged to restrict the displaceability of the conductor 34 in the channel 33 of the casing part in a direction perpendicular to the longitudinal direction of the channel. The spacers 20a, 20b, 42 are suitably arranged to keep the conductor 34 centered in the channels 33 of the casing parts 32. One such spacer 42 arranged in the channel 33 of a casing part 32 is illustrated in FIG. 2. The spacer 42 may also be arranged to fill the whole or a major part of the channel 33 of a casing part 32, as illustrated in FIG. 1b, and thus constitute the above-indicated dielectric medium.

Figure 3:
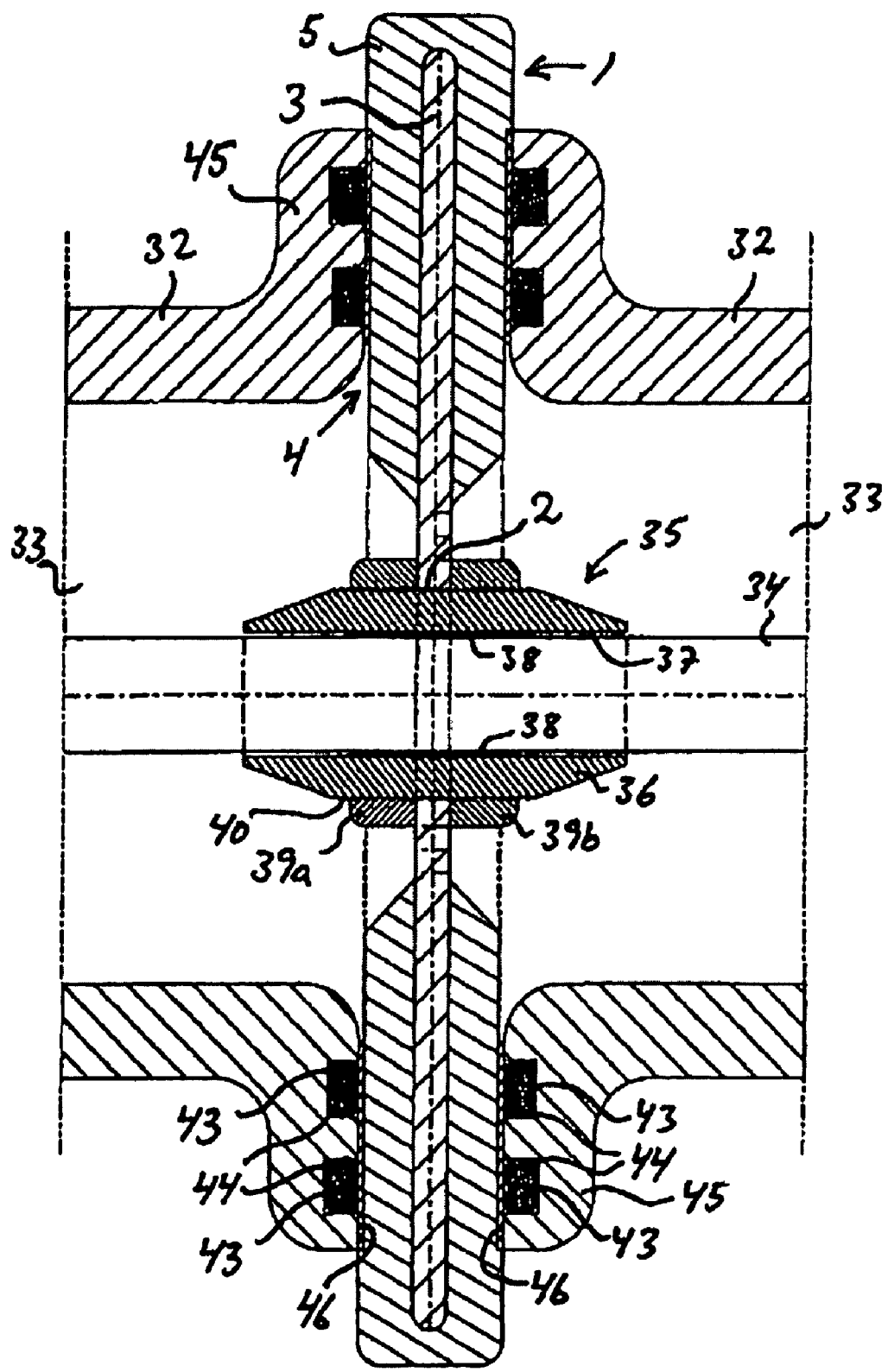
FIG. 3 shows in a schematic longitudinal sectional view a detail enlargement of the connection between an electrode and two adjacent casing parts of the connecting device of FIGS. 1a, 1b and 2.

In the examples illustrated in FIGS. 1-3, each electrode 1 is provided with an insulation 5 of electrically non-conductive material and is arranged between two adjacent casing parts 32 with the two casing parts 32 facing opposite sides of the insulation 5 of the intermediate electrode. A part of the conductive member 3 of the electrode surrounding the above-indicated hole 2 is not covered by the insulation 5 so as to make possible the connection of the conductive member 3 to the connection member 35.

At least one annular sealing member 43, such as an O-ring, is with advantage provided between a casing part 32 and an adjacent electrode 1. In the example illustrated in FIG. 3, two such sealing members 43 are provided. The respective sealing member 43 is arranged in a groove 44, which is arranged in a flange 45 at the end of the casing part 32 and which surrounds the channel opening at this end of the casing part 32. In the illustrated example, the casing part 32 is clamped against the insulation 5 of the adjacent electrode via said flange 45. The opening of the respective groove 44 is preferably covered by an annular plate 46 of electrically conductive material arranged between the flange 45 of the casing part 32 and the insulation 5 of the adjacent electrode in order to prevent partial discharges in the associated-area between the casing part 32 and the insulation 5 of the electrode. The annular plate 46 is arranged surface-to-surface with the insulation 5 of the electrode. The annular plate 46 will ensure that the electric potential around any gas pocket remaining in one of said grooves 44 is constant or at least near constant so that no partial discharge will occur therein.

The conductor 34 arranged in the casing 31 of the connecting device 30 is in the example illustrated in FIGS. 1a and 1b connected to a voltage source via a conductor 47, which extends through a branching pipe 48 that is secured to one of the casing parts 32 of the casing 31. Also the branching pipe 48 is with advantage filled with dielectric medium.

Figure 4:
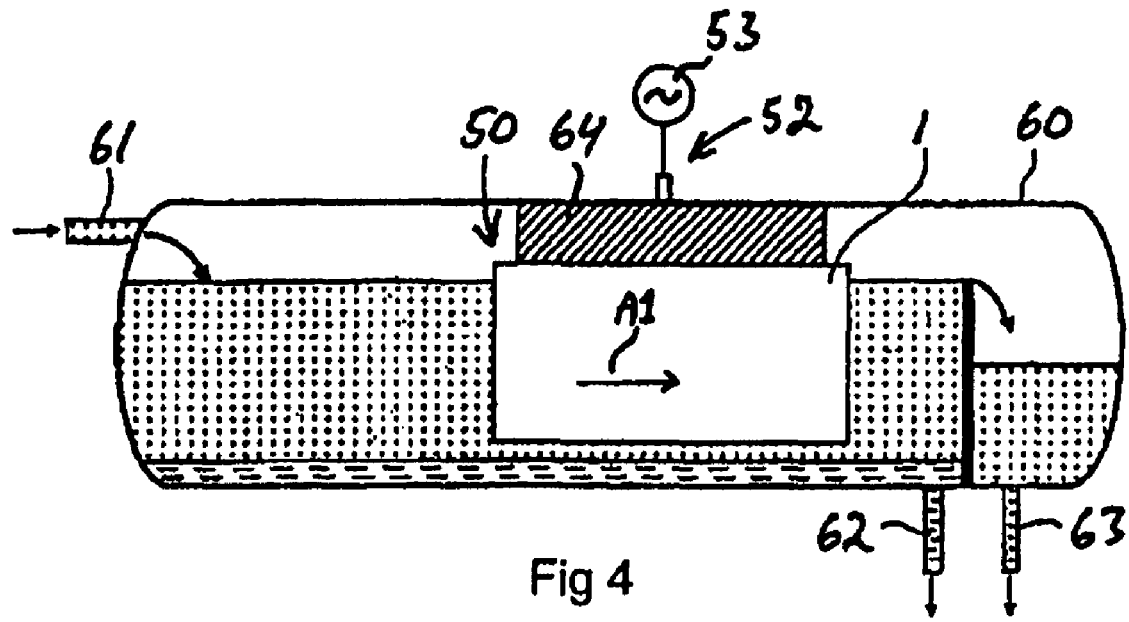
FIG. 4 is a schematic longitudinal sectional view of an electrical appliance according to the present invention in the form of an electrostatic coalescing device arranged in a vessel.
Figure 5:
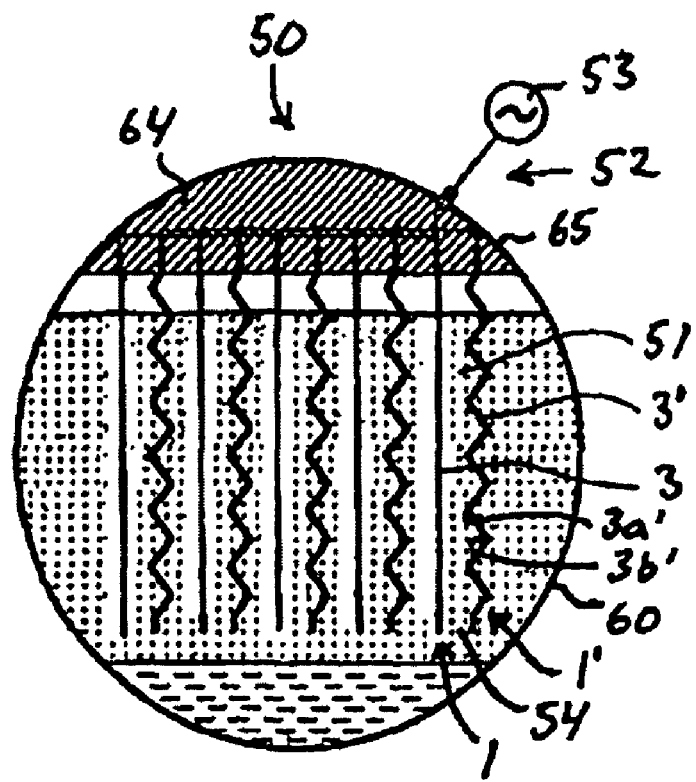
FIG. 5 is a schematic cross-sectional view of the electrostatic coalescing device and the vessel of FIG. 4.

FIGS. 4 and 5 very schematically illustrate an electrical appliance according to the present invention in the form of an electrostatic coalescing device 50. In the illustrated example, the coalescing device 50 is located inside a vessel 60, which is provided with an inlet 61 for receiving an emulsion to be treated by the coalescing device 50. The vessel 60 is also provided with a first outlet 62 for a first emulsion component that has been separated from the emulsion in the vessel under the action of gravity, and a second outlet 63 for a second emulsion component or the remaining emulsion from which at least a part of said first emulsion component has been separated. The coalescing device 50 comprises several electrodes 1, 1' arranged side-by-side so as to form a set of electrodes 1, 1' with several intermediate flow passages 51. Each electrode 1, 1' comprises a sheet-shaped conductive member 3, 3' of electrically conductive material. In the illustrated example, every second electrode 1 of said set comprises a planar conductive member 3 and every second electrode 1' comprises a corrugated conductive member 3'. Alternatively, all electrodes 1, 1' could be provided with planar conductive members or all electrodes 1, 1' could be provided with corrugated conductive members. The coalescing device 50 also comprises power supply means 52 including a voltage source 53, preferably a high-voltage source, for applying different electric potentials to the conductive members 3, 3' of the electrodes of said set so as to form an electric field between each pair of adjacent electrodes 1, 1'. The corrugated conductive members 3' are so arranged that the ridges 3a' and valleys 3b' thereof extend in a direction A1 corresponding to the normal flow direction for the emulsion received in the vessel 60. The electrodes 1, 1' are vertically arranged and are suspended by a holder 64 secured at the upper part of the vessel.

In the embodiment illustrated in FIGS. 4 and 5, the conductive member 3 of every second electrode 1 is electrically connected to the voltage source 53 of the power supply means 52 via a connecting device 30 (not shown in FIGS. 4 and 5) of the type described with reference to FIGS. 1-3 and the conductive member 3' of every second electrode 1' is grounded and thus connected to the same electric potential as the electrically conductive component of the surrounding fluid or fluids. In this case, each one of the conductive members 3 connected to the voltage source 53 is at least partially enclosed by an insulation 5 of electrically non-conductive material, whereas each one of the grounded conductive members 3' may be uninsulated. In the illustrated example, the conductive members 3' are grounded by being electrically connected to the outer wall 65 of the vessel 60.

The electrodes 1, 1' are preferably arranged to extend essentially vertically with an opening 54 extending along the lower end of the flow passage 51, i.e. between the lower edges of the electrodes 1, 1', so as to allow heavier components of an emulsion passing through the flow passages 51 between the electrodes to sink out of the flow passages 51 via this opening 54 under the action of gravity.

The voltage source 53 included in the power supply means 52 could be an alternating voltage source or a direct-current voltage source. The voltage source 53 is preferably a high-voltage transformer. The voltage source 53 may be arranged on the inside or the outside of the outer wall 65 of the vessel 60. It is also possible to arrange some part or parts of the voltage source 53 outside the vessel 60 and some part or parts inside the vessel 60. In the latter case, the voltage source 53 may for instance comprise a transformer that is arranged outside the vessel 60 and connected to one or several transformers arranged inside the vessel.

In the examples illustrated in FIGS. 4 and 5, the vessel 60 is a gravity settling tank. However, the coalescing device 50 according to the present invention is of course not limited to the use in such a settling tank. The coalescing device could for instance be located in a tube, a pipeline or the like.

The coalescing device 50 may with advantage comprise several electrode sets of the above-indicated type. The electrodes 1, 1' of each set are preferably pre-assembled to form a separate electrode module. Each electrode set/module may be provided with its own power supply. Two or more of these sets/modules may be arranged at the side of each other so as to form a row of two or more electrode sets/modules and/or two or more of these sets/modules may be arranged above each other so as to form a column of two or more electrode sets/modules.

Figure 6:
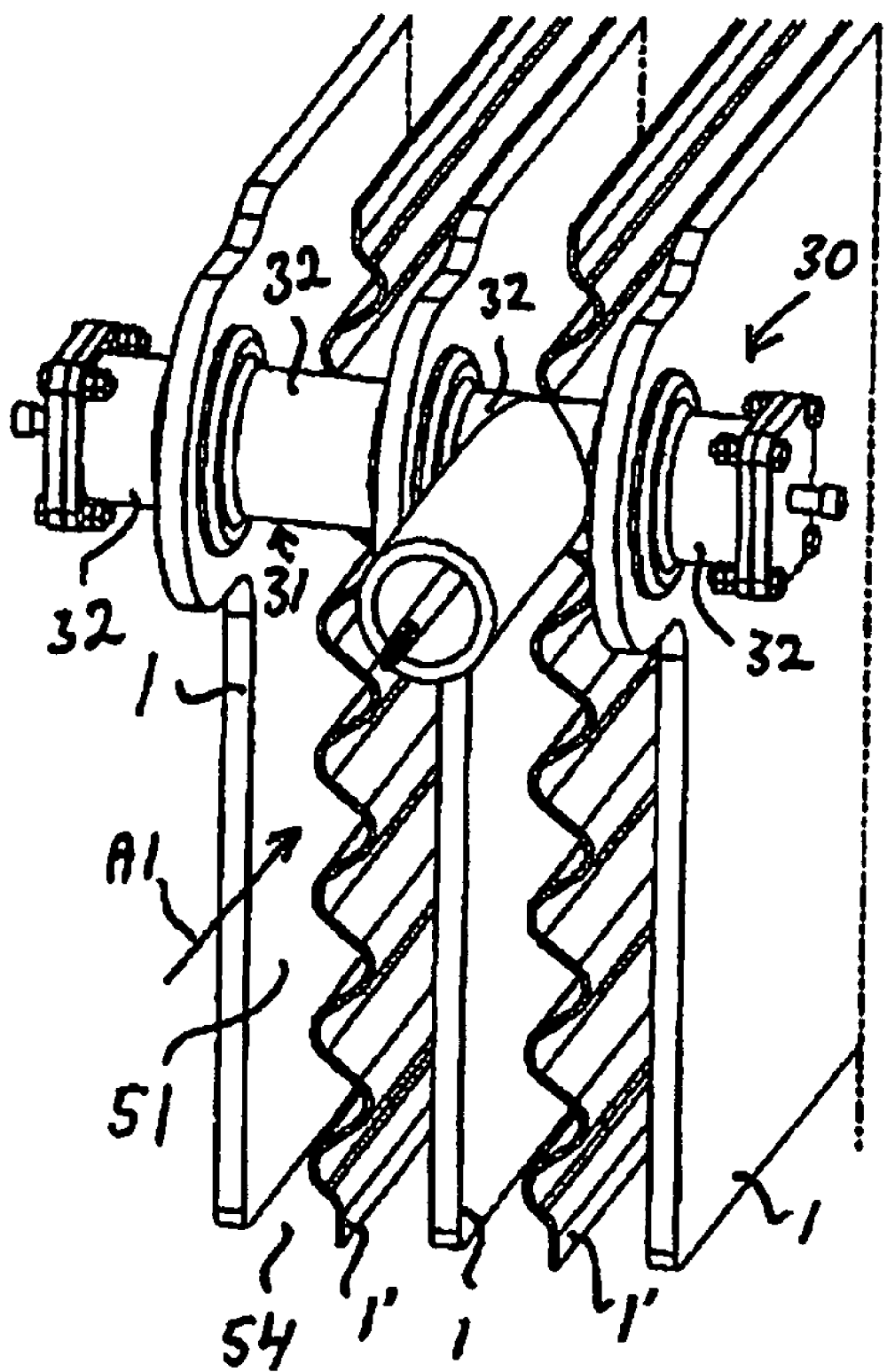
FIG. 6 is a schematic perspective view of a connecting device and sheet-shaped electrodes included in the coalescing device of FIGS. 4 and 5.

FIG. 6 illustrates a number of electrode pairs included in the electrostatic coalescing device 50 of FIGS. 4 and 5. The planar electrodes 1 are in the illustrated example electrically connected to the conductor of a connecting device 30 of the type described above with reference to FIGS. 1-3, whereas the intermediate corrugated electrodes 1' are not electrically connected to said conductor.

Although the invention is applicable to any type of oil-treatment, it is particularly advantageous in off-shore applications involving a coalescing device arranged for promoting or effectuating separation of water from oil or water droplet enlargement.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An electrical appliance, comprising:
    at least one sheet-shaped electrode; and
    a connecting device for electrically connecting said at least one electrodes to a voltage source, the connecting device comprising a casing comprising two or more tubular casing parts, each of which enclosing a channel filled with a dielectric medium, the connecting device further comprising an elongated conductor for feeding electric power from the voltage source to said one or several electrodes, said conductor extending through the channels of said casing parts and being surrounded by the dielectric medium wherein the casing is secured to said at least one electrode with the conductor extending through a hole in an electrically conductive member of each individual electrode, the conductor being electrically connected to the conductive members of the electrodes and each individual electrode having a part arranged between two of said casing parts with the two casing parts clamped against opposite sides of the intermediate electrode part.

2. The electrical appliance according to claim 1, wherein the casing parts are sealingly clamped against the intermediate electrode parts so as to thereby seal the channels of the casing parts from the surroundings.

3. The electrical appliance according to claim 1, wherein at least one of said electrodes comprises electrically non-conductive insulation material and is arranged between two adjacent casing parts with the two casing parts facing opposite sides of the insulation of the intermediate electrode.

4. The electrical appliance according to claim 3, further comprising:
    at least one annular sealing member arranged between a casing part and an adjacent electrode, said sealing member being arranged in a groove, which is arranged in the insulation of the electrode or in the casing part.

5. The electrical appliance according to claim 4, wherein said groove is arranged in the casing part, the electrical appliance further comprising:
    an annular plate covering the opening of the groove, the annular plate comprising electrically conductive material and being arranged between the casing part and the insulation of the electrode in order to prevent partial discharges in the associated area between the casing part and the insulation of the electrode.

6. The electrical appliance according to claim 5, wherein said annular plate is arranged surface-to-surface with the insulation of the electrode.

7. The electrical appliance according to claim 1, wherein the conductor is electrically connected to the respective electrode via an electric connection member arranged inside the casing in electrical contact with the conductor and the conductive member of the electrode.

8. The electrical appliance according to claim 7, wherein said connection member comprises a sleeve of electrically conductive material attached around the conductor in electrical contact therewith, the conductive member of the associated electrode being electrically connected to the sleeve.

9. The electrical appliance according to claim 8, wherein the conductive member of said electrode is secured to said sleeve.

10. The electrical appliance according to claim 8, wherein said sleeve is clamped to the conductor in such a manner that the conductor is slidable relative to the sleeve in the longitudinal direction of the conductor.

11. The electrical appliance according to claim 10, wherein flexible contact elements protrude on the inner surface of the sleeve, the sleeve being in electrical contact with the conductor via these contact elements.

12. The electrical appliance according to claim 1, wherein the conductor has the form of a rod of electrically conductive material.

13. The electrical appliance according to claim 1, wherein the casing parts are clamped to the intermediate electrode parts by a traction force exerted via the conductor.

14. The electrical appliance according to claim 1, wherein at least one of said casing parts comprises at least one spacer of electrically non-conductive material which is arranged to restrict the displaceability of the conductor in the channel of the casing part in a direction perpendicular to the longitudinal direction of the channel.

15. The electrical appliance according to claim 1, wherein the electrical appliance constitutes an electrostatic coalescing device.

* * * * *